United States Patent Office 3,145,106
Patented Aug. 18, 1964

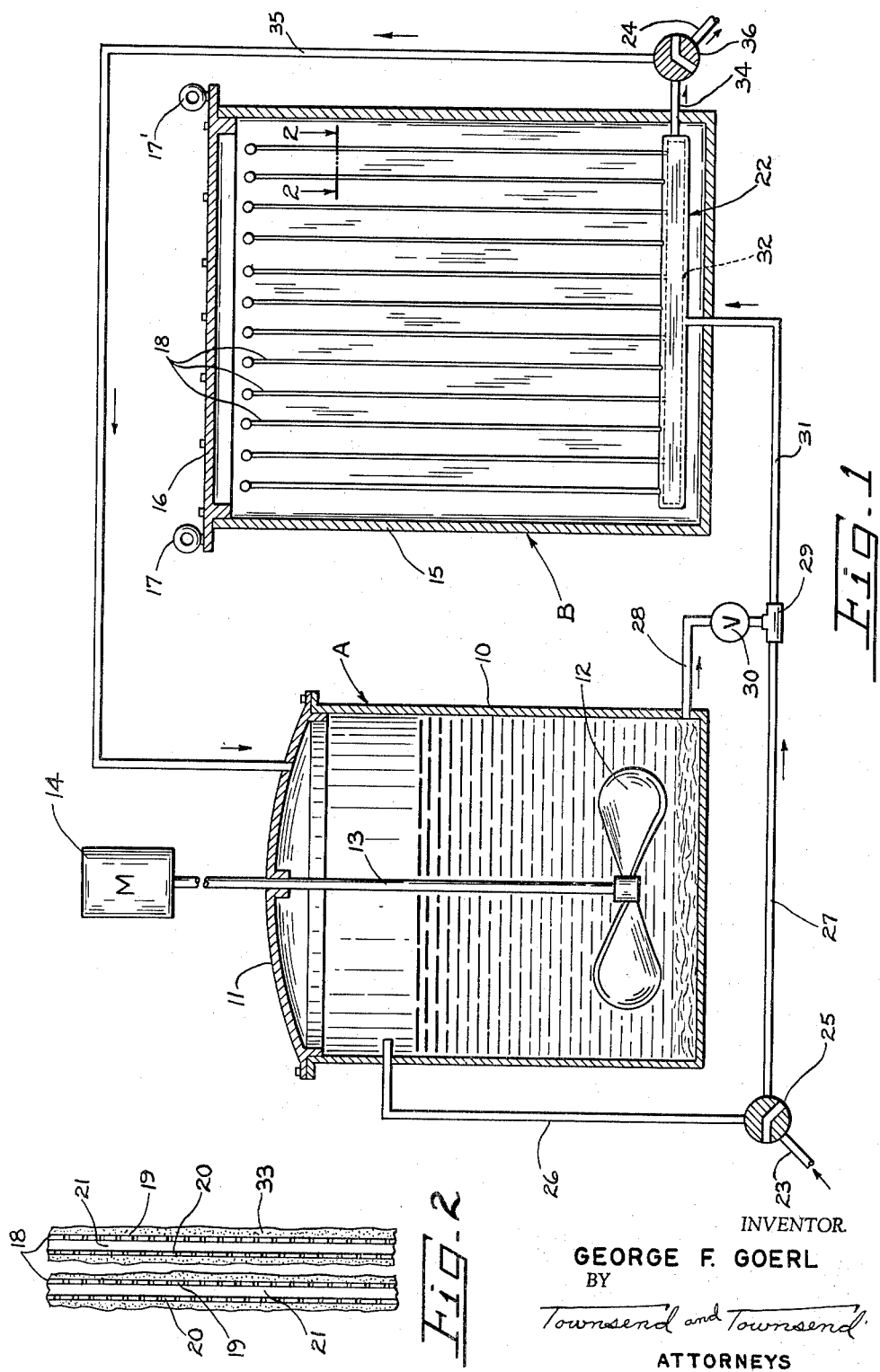

3,145,106
ADDITION OF DRY CLAY TO BEER
George F. Goerl, Orinda, Calif., assignor to American Tansul Company, San Francisco, Calif.
Filed Aug. 24, 1962, Ser. No. 219,308
6 Claims. (Cl. 99—48)

This invention relates to the addition of certain clays to beer for chill-proofing the beer. More specifically it relates to a method for adding the clay directly to beer in dry form.

In the accompanying drawings there is shown in FIG. 1, schematically and in side section, a portion of beer processing apparatus suitable for use with the present invention.

FIG. 2 shows an enlarged top section of a portion of the filter screens with filter cake thereon of FIG. 1 and taken along the line 2—2 in FIG. 1.

The gist of the present invention lies in the addition of chill-proofing clay to beer in dry form without first forming an aqueous slurry of the clay as in prior procedures. The dry clay is introduced into the beer by incorporating the clay in the conventional filter cake used to pre-filter beer after fermentation. The clay enters the beer as the beer passes through the filter cake. By adding the clay in dry form the sludge and beer loss attendant the use of hydrated clay is avoided. In addition, the chill-proofing effect of the clay appears to be enhanced by the present method.

Thus in the preferred embodiment there is provided an improved method for adding clay to beer in order to chill-proof the beer comprising slurrying diatomaceous earth and hectorite in a preselected volume of beer, forming an initial filter cake from said slurry of diatomaceous earth and hectorite, and flowing beer after fermentation through said filter cake to pre-filter the beer and to erode hectorite from the filter cake into the beer to chill-proof the beer. A beer slurry of diatomaceous earth and hectorite is continuously added in controlled quantities to beer prior to passage of the beer through the filter cake in order to continuously build up the filter cake and replace eroded hectorite. The initial cake and continuous addition are controlled to provide about 200 p.p.m. of hectorite with respect to the beer for erosion into the beer.

The present invention applies to malt beverages generally including beer, ale, stout, and the like. For ease of description, beer has been frequently used throughout the specification and claims. However, wherever the term "beer" appears it should be understood that the other related malt beverages could be readily substituted therefor.

Beer production follows a generally accepted sequence of steps. First, aqueous extract from suitable grain is fermented to produce beer. After fermentation has been completed, the temperature is dropped to approximately 30° F. and the beer is transferred from the fermentation equipment into a storage tank for a rest or aging period at about 30–32° F. The rest period may be as little as five days and in some cases as much as three months. Carbon dioxide may or may not be introduced into the beer during the rest period. The carbon dioxide is used to partially carbonate the beverage and purge the liquid of entrapped air.

After this first storage the beer is put through a pre-clarification or pre-filtration operation. This is usually accomplished with some mechanical means such as a centrifuge or a filter. The present invention comes into play in this preclarification step. Most prevalently, the pre-clarification or first filtration (a second or polish filtration occurs at the termination of the processing of the beer) is accomplished by passing the beer through a filter cake formed by any suitable porous filtering substance. Most preferably and commonly, the substance employed is diatomaceous earth. However, other suitable substances such as perlite or cotton fibrous pads might be used as alternatives.

After pre-filtration the beer is then transferred into a finishing storage tank for another storage period of about one to five days during which time final carbonation is accomplished. Following the finishing period the beer is polish filtered. The beer is then in a form as found in the final product when purchased by the consumer.

During the course of the processing subsequent to fermentation, several treatments have become standard which serve to stabilize and make the final product more desirable in many respects. The beer may be treated with a clay for chill-proofing purposes in accordance with the method described in United States Patent No. 2,416,007, dated February 18, 1947. That patent teaches the addition of an aqueous suspension of suitable clays into the beer for removing foreign or partially soluble substances from beer such as undesirable proteins or proteinaceous complexes.

A number of improvements have been made upon said patent most of which include the preparation of an aqueous suspension of the clay prior to its addition to the beer. The present method is a further improvement upon said patent and prior techniques in that the aqueous suspension is avoided and the clay in dry form is added directly to the beer.

The most significant phenomenon that has been observed when dry clay is added to beer as opposed to aqueous suspensions of clay is that the clay does not swell as in aqueous addition techniques. This difference in the properties of the clay between the two types of addition is most important from an economic standpoint. In the aqueous addition of the clay the fully hydrated clay flocks and precipitates forming a sediment or sludge on the bottom of the treatment tank. When clay is added dry to beer it remains in the beer in particle size and no flocculation as such occurs.

Specifically, the practical advantage which follows from the use of dry clay includes the ease with which the beer may be finally filtered because of the simplicity of separating the non-flocculated clay after it has performed its function. Most important, the use of dry clay greatly reduces the volume of the trapped beer in the clay because of the non-flocculated, high density characteristics of the clay when added dry. This means a higher yield of beer per unit of beer-making ingredients.

In all respects the present method is similar to the prior methods of treating beer except that the clay is added in dry form and at the point in the processing where the pre-filtration occurs. Aside from this difference all other prior techniques for treating the beer may be used as desired. Thus the various other treatments for stabilizing and clarifying beer may be used in addition to the clay treatment. These additional steps may include the use of reducing agents such as potassium metabisulfite, or preferably $SO_2$ gas itself, in accordance with United States Patent No. 2,916,377, dated December 8, 1959. It is also common to employ a proteolytic enzyme such as bromelin and/or papain. The use of these other materials in the presently improved process is unchanged in any significant respect from prior techniques such as quantity of these other materials which may be employed or the point in the brewing process where they may be added. For example, when $SO_2$ gas is used, it may be introduced in the range of 5 to 30 p.p.m. and the enzyme dosage may be between 500–15,000 activity units per 100 barrels of beer processed, and they may be added at any point after fermentation, individually or simultaneously.

The specific formation of the filter cake and the incorporation of a suitable chill-proofing clay for erosion into the beer will be best described and understood with reference to the accompanying drawings. In FIG. 1 there is shown schematically a conventional slurry feeder tank A and filtration tank B linked to each other and to the main beer flow line as will be more fully described hereinafter by a plurality of suitable conduits and valves. Slurry feeder tank A includes a fluid holding portion 10 and a lid 11 bolted thereto for maintaining pressure therein. A stirrer 12 is mounted within tank A on shaft 13. Shaft 13 is suitably linked for rotation to motor 14. Tank B includes a liquid holding portion 15 and a pressure lid 16 thereon. Lid 16 is removable by lifting on eyes 17, 17' so that interior of tank B may be periodically cleaned of spent filter cake.

Interiorly of tank B there is mounted a plurality of vertical parallel filter screens 18 such as those commercially available and known as Bowser #2 filters. Filter screens 18, as will be most clearly seen in FIG. 2, each comprise two sides 19 and 20 with a channel 21 therebetween. Each channel 21 is in fluid communication at the bottom of the filter screens 18 with a manifold 22.

As conventionally used, beer is flowed under pressure (preferably about 50–75 lbs.) from fermentation and its initial rest period into conduit 23 for the pre-filtration step. Pre-filtration is accomplished in the device illustrated and the pre-filtered beer is flowed out through conduit 24 for the next step in the processing of the beer, i.e., to the finishing storage tank.

In order to pre-filter the beer, a filter cake made from a suitable constituent such as diatomaceous earth is precoated on filter screens 18 as follows. A quantity of the filter cake constituent is placed in tank A by opening lid 11. The amount of filter cake constituent such as diatomaceous earth will depend upon the quantity of beer to be processed and its effectiveness as a filter. The amount employed will be that sufficient to substantially clarify the beer passed therethrough. It has been found that about 150 lbs. of diatomaceous earth will satisfactorily clarify about 300–315 barrels of beer.

Along with the filter cake constituent that is placed in tank A is a suitable volume of beer. The beer enters tank A from conduit 23 through 2-way valve 25 and conduit 26 when valve 25 is positioned so that fluid communication is established between conduit 23 and conduit 26. The volume of beer so placed in tank A may be varied as desired and generally will be that amount which is sufficient to fluidize the diatomaceous earth or equivalent and permit the fluidized mass to be flowed into tank B and coated on filter screens 18. When sufficient beer has been placed in tank A flow of beer from conduit 23 is ceased.

At the lower portion of tank A conduit 28 joins conduit 27 at T connection 29. A metering valve 30 for regulating the flow of materials through conduit 28 into T 29 is provided in conduit 28. Conduit 27 links T 29 with conduit 23 through valve 25.

After the beer and diatomaceous earth are placed in tank A, stirrer 12 is actuated by means of motor 14 until the diatomaceous earth and beer have been transformed into a substantially homogeneous flowable mass. At that point valve 30 is opened and the mass in tank A is flowed by gravity and existing pressure in tank A through valve 30, T 29, and through conduit 31 (which links T 29 with tank B) into distributor 32 at the bottom of tank B. Distributor 32 permits the mass to be forced upwardly and distributed evenly between all of the filter screens 18. The beer portion of the mass flows through sides 19 and 20 of each filter screen 18 and into each channel 21, and then downwardly into manifold 22. At the same time, diatomaceous earth is stopped by screens 18 and commences formation of a porous filter cake 33 on the surfaces thereof. The beer and some portions of the diatomaceous earth which may pass through screens 18 is returned to tank A through conduits 34 and 35 when 2-way valve 36 is positioned to link conduits 34 and 35. Flow of the mass in tank A through the filter screens 18 and back through manifold 22 and conduits 34 and 35 is continued until a substantial initial cake 33 is built on screens 18. The initial cake is suitable for use when the beer returning to tank A from conduit 35 becomes relatively clear.

At that point valve 25 is positioned to place conduit 23 in fluid communication with conduit 27 and valve 36 is positioned to place conduit 34 in fluid communication with conduit 24. Beer is then flowed from fermentation and storage into conduit 33 through conduits 27, 31 and into distributor 32. The beer then flows through filter cake 33, filter screens 18, down channel 21 into manifold and out through conduits 34 and 24 for subsequent processing.

At the same time metering valve 30 is opened to continuously inject the beer and diatomaceous earth that remains in tank A into the beer stream flowing past T 29. The beer flow through T 29 picks up the mass of beer and diatomaceous earth from tank A and carries it into tank B. As the beer passes through filter cake 33 it continuously deposits more of the diatomaceous earth onto filter screens 18 and thereby increases the size of the filter cake as the process continues. Valve 30 is regulated so that the beer emerging from conduit 24 is clear. Preferably, the diatomaceous earth and beer mass in tank A is exhausted at approximately the same time that the total volume of beer being processed has passed through the pre-filtration apparatus of FIG. 1.

In the practice of the present invention the foregoing steps are executed in the manner above described except that the chill-proofing clay is added to tank A along with the filter cake constituents. Preferably, the chill-proofing clay is a montmorillonite clay of which the member hectorite has been found to be most satisfactory.

The clay is added along with the filter cake constituent and the selected volume of beer necessary to form a flowable slurry. Again, stirrer 12 is actuated to form a generally homogeneous mass. When the mass including the clay is flowed into contact with filter screens 18, the cake 33 will be formed from a combination of the filter cake constituent and the chill-proofing clay. Similarly, after the initial cake has been formed, the material metered through valve 30 into the main beer flow will contain both the filter cake constituent and the chill-proofing clay so that both will be continuously deposited on the surface of filter screens 18 as the process continues.

In accordance with the present discovery, it has been found that the beer flow through distributor 32 continues to deposit the combination of materials on screens 18 in the same manner that the filter cake constituent was heretofore deposited. However, it has been further discovered that as the beer passes through the filter cake 33 it erodes previously deposited chill-proofing clays therefrom and into the beer. Therefore, as the beer passes through channel 21 and ultimately out through conduit 24, it will carry eroded chill-proofing clay in a condition most suitable for the chill-proofing of the beer. Chill-proofing is accomplished by allowing the clay to remain in contact with the beer for a suitable period of time and subsequently separating the chill-proofed beer from the chill-proofing clay.

The amount of chill-proofing clay added in combination with the filter cake constituent is consistent with prior art techniques. Thus the chill-proofing clay such as hectorite will be added to the filter cake constituent in the amount of about 150–500 p.p.m. with respect to the beer processed and most preferably, about 200 p.p.m.

As in the conventional technique, an initial filter cake is formed on filter screens 18. In the present method the initial cake will include the chill-proofing clay incorporated into the cake structure. As the beer flows from conduit 23 through the linking conduits and through filter screens 18, the clay is eroded from the cake. In the embodiment illustrated, the combination of filter cake constituent and chill-proofing clay being continuously metered to the main beer flow by valve 30 will continuously replace the eroded chill-proofing clay. At the same time the filter cake itself is continuously built up by the added cake constituent.

As an illustration of the present invention, 300 barrels of ale were fermented in conventional manner for a period of about 7-9 days. After a normal rest period of 10-21 days, the ale was processed for pre-filtration in accordance with the present invention. In this illustration 150 lbs. of diatomaceous earth (Johns-Manville High Flow Filter Aid) and 15 lbs. of purified hectorite in dry state were placed in slurry tank A. The filter screens 18 in filter tank B were pre-coated with the mixture as generally described above. It was observed during this pre-coating operation that the filter screens 18 were pre-coated more rapidly than when the hectorite was not used. In addition, it was noted that the liquid effluent cleared up faster, i.e., 5-10 minutes instead of the usual 15-20 minutes, without the use of hectorite.

After the initial filter cake was formed, ale from fermentation was flowed through the initial filter cake while the remainder of the mass in slurry tank A was metered through valve 30 so that the mass was exhausted from tank A at about the time that the 300 barrels of ale to be processed had passed through tank B.

During the passage of the 300 barrels of ale through filter screens 18, previously deposited hectorite was continuously eroded or sloughed off the filter cake and into the ale. The hectorite remained suspended in the filtered ale and was observable as readily discernible particles. After the hectorite accomplished the chill-proofing and adsorbing of the usual complexes desired to be removed from the ale, the hectorite was settled out as a fine powder in the bottom of a storage vessel. (During the course of the ale processing, a treatment with a proteolytic enzyme and $SO_2$ was employed in the usual fashion.)

After the hectorite settled out, finish or polish filtration was easily accomplished. The storage vessel from which the ale was finish filtered was found to have a very slight sediment or granular chocolate brown deposit not previously noticed in the absence of hectorite treatment in accordance with the present invention.

There was also evidence of some hectorite remaining in the filter cake since previously unobserved chocolate brown specks were found in the spent filter cake. This brown color is from hectorite after it has accomplished its adsorption purposes.

The clarity of the final ale product was particularly good as will be seen in the following table comparing the ale produced by the foregoing steps with distilled water and ale processed by the same steps but without the incorporation of hectorite in the filter cake. The clarity is given in terms of Pulfrich units denoting relative turbidity as measured by a Zeiss photometer. The Pulfrich unit is a comparison of the amount of light refracted by a sample of beer or ale compared with a light source as seen through a ground glass filter. It is expressed as percent of the light source as seen through the ground glass filter. For example, a reading of 20 Pulfrich units indicates that a value equal to 20% of the value of the light source as seen through the ground glass filter was refracted in the sample. The results are as follows.

Table

| Sample: | Pulfrich units |
|---|---|
| Ale processed without hectorite in the filter cake | 100 |
| Ale processed by the present invention | 20 |
| Distilled water | 3-5 |

The present method provides a product having greatly enhanced flavor stability. The original flavor of the product is more mellow and more ameliorated. It is believed that some of these advantages occur because the erosion process creates a larger surface area of the chill-proofing clay for reaction with the beer or ale than is possible in the prior slurry addition techniques.

It will be appreciated that the combination of the chill-proofing clay with the filter cake constituent need not be employed with a filter screen as described herein. The present method may be adapted for use in a suitable column-type treatment for example. Also, instead of a slurry feeder tank as shown, an attritian-type feeder may be substituted.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In the method of processing beer including the steps of forming a porous filter cake and passing the beer therethrough in order to pre-filter the beer after fermentation, the combination therewith of forming said filter cake by incorporating a swelling, gelling chill-proofing clay therein whereby the beer passing through said filter cake erodes at least portions of said clay from the cake into the beer to chill-proof the beer, and thereafter separating the chill-proofed beer from the clay.

2. In the method of processing beer including the steps of forming a porous filter cake from diatomaceous earth and passing the beer therethrough in order to pre-filter the beer after fermentation, the combination therewith of forming said filter cake by incorporating sufficient montmorillonite clay therein to chill-proof the beer passing through the cake, the beer being operable to erode clay from the filter cake into the beer as the beer passes therethrough and the eroded clay in the beer acting to chill-proof the beer, and thereafter separating the chill-proofed beer from the clay.

3. The method in accordance with claim 2 wherein the montmorillonite clay is hectorite.

4. An improved method for adding chill-proofing clay to beer comprising forming a pre-filter cake for beer by incorporating a swelling, gelling chill-proofing clay into the structure of the cake, passing beer after fermentation through the filter cake, the beer being operable to erode clay from the filter cake while passing therethrough and the eroded clay serving to chill-proof the beer, and continuously adding filter cake constituents and chill-proofing clay to beer prior to passage of the beer through the filter cake to build up the filter cake and to continuously replace the chill-proofing clay that is eroded by beer flow through the cake.

5. An improved method for adding chill-proofing clay to beer comprising initially forming a pre-filter cake for beer by incorporating a montmorillonite clay into the cake, passing beer after fermentation through the cake to pre-filter the beer, the beer eroding clay from the cake into the beer while passing through the cake for chill-proofing the beer, and continuously adding filter cake constituents and montmorillonite clay to beer prior to the passage of the beer through the filter cake to build up the cake as the beer passes therethrough and to continuously replace eroded clay, the total of said clay initially incorporated in the filter cake and continuously added being in an amount sufficient to provide about 150-500 p.p.m. of the clay with respect to the total volume of beer passed through the filter cake.

6. An improved method for adding clay to beer in order to chill-proof the beer comprising slurrying diatomaceous earth and hectorite in a preselected volume of beer, forming an initial filter cake from said slurry of diatomaceous earth and hectorite, flowing beer after fermentation through said filter cake to prefilter the beer and to erode hectorite from the filter cake into the beer to chill-proof the beer, continuously adding a beer slurry of diatomaceous earth and hectorite in controlled quantities to beer prior to passage of the beer through the filter cake in order to continuously build up the filter cake and replace eroded hectorite, said initial cake and continuous addition being controlled to provide about 200 p.p.m. of hectorite with respect to the beer for erosion into the beer.

References Cited in the file of this patent
UNITED STATES PATENTS

| | | |
|---|---|---|
| 2,916,377 | Shaler et al. | Dec. 8, 1959 |
| 3,066,026 | Shaler et al. | Nov. 27, 1962 |
| 3,100,707 | Shaler et al. | Aug. 13, 1963 |